United States Patent
Huang

(10) Patent No.: US 9,746,128 B2
(45) Date of Patent: Aug. 29, 2017

(54) ADJUSTABLE DUAL-SCREEN MONITOR STAND

(71) Applicant: CHEN-SOURCE INC., Taoyuan (TW)

(72) Inventor: Kuan-Hsiang Huang, Taoyuan (TW)

(73) Assignee: Chen-Source Inc., Taoyuan (TW)

( * ) Notice: Subject to any disclaimer, the term of this patent is extended or adjusted under 35 U.S.C. 154(b) by 0 days.

(21) Appl. No.: 15/137,319

(22) Filed: Apr. 25, 2016

(65) Prior Publication Data

US 2017/0191607 A1 Jul. 6, 2017

(30) Foreign Application Priority Data

Jan. 4, 2016 (TW) .............................. 105200027 U

(51) Int. Cl.

| F16M 11/10 | (2006.01) |
|---|---|
| F16M 11/22 | (2006.01) |
| F16M 11/20 | (2006.01) |
| A47B 97/04 | (2006.01) |
| F16M 11/08 | (2006.01) |
| A47B 97/00 | (2006.01) |

(52) U.S. Cl.
CPC ......... F16M 11/2014 (2013.01); A47B 97/04 (2013.01); F16M 11/08 (2013.01); F16M 11/10 (2013.01); F16M 11/22 (2013.01); A47B 2097/005 (2013.01)

(58) Field of Classification Search
CPC .... F16M 11/2014; F16M 11/10; F16M 11/22; F16M 13/02; F16M 2200/022; F16M 2200/06; F16M 11/08; A47B 97/04; A47B 2097/005; A47B 97/001

USPC .... 248/118, 121, 122.1, 124.1, 125.1, 274.1, 248/276.1, 278.1, 280.11, 28, 2.1, 284.1
See application file for complete search history.

(56) References Cited

U.S. PATENT DOCUMENTS

| 4,836,486 A * | 6/1989 | Vossoughi | F16M 11/2014 248/280.11 |
|---|---|---|---|
| 5,342,137 A * | 8/1994 | Peng | F16C 11/04 248/122.1 |
| 5,429,336 A * | 7/1995 | Ko | F16M 11/10 248/278.1 |
| 6,554,238 B1 * | 4/2003 | Hibberd | A47B 81/061 248/278.1 |
| 6,726,167 B2 * | 4/2004 | Oddsen, Jr. | F16M 11/10 248/274.1 |

(Continued)

*Primary Examiner* — Muhammad Ijaz
(74) *Attorney, Agent, or Firm* — Muncy, Geissler, Olds & Lowe, P.C.

(57) ABSTRACT

An adjustable dual-screen monitor stand includes a base member having an upright post, an upper bushing and a lower bushing mounted on the upright post at different elevations, a first cantilever swivel screen mount including a first lower swivel arm, a first upper swivel arm and a first screen holder pivotally coupled to one another and pivotally supported on the upper bushing to hold a first flat display monitor and to allow adjustment of the angular position of the supported first flat display monitor, and a second cantilever swivel screen mount including a second lower swivel arm, a second upper swivel arm and a second screen holder pivotally coupled to one another and pivotally supported on the lower bushing to hold a second flat display monitor and to allow adjustment of the angular position of the supported second flat display monitor.

9 Claims, 9 Drawing Sheets

(56) References Cited

U.S. PATENT DOCUMENTS

| | | | | |
|---|---|---|---|---|
| 6,983,917 B2* | 1/2006 | Oddsen, Jr. | F16M 11/2014 | 248/274.1 |
| 7,207,537 B2* | 4/2007 | Hung | F16M 11/10 | 248/274.1 |
| 7,264,212 B2* | 9/2007 | Hung | F16M 11/10 | 248/184.1 |
| 7,338,022 B2* | 3/2008 | Hung | F16M 11/041 | 248/278.1 |
| 7,389,965 B2* | 6/2008 | Oddsen, Jr. | F16M 11/10 | 248/274.1 |
| 7,458,549 B2* | 12/2008 | Oddsen, Jr. | F16M 11/10 | 16/321 |
| 7,837,674 B2* | 11/2010 | Cooper | B25J 19/0016 | 248/280.11 |
| D649,552 S * | 11/2011 | Huang | F16M 11/08 | D14/452 |
| 8,056,874 B2* | 11/2011 | Goodwin | A61G 5/10 | 248/276.1 |
| 8,070,114 B2* | 12/2011 | Chen | F16M 11/14 | 248/121 |
| 8,162,271 B2* | 4/2012 | Li | F16M 11/105 | 248/162.1 |
| D660,308 S * | 5/2012 | Huang | D14/452 | |
| 8,245,991 B2* | 8/2012 | Hung | F16M 11/2021 | 248/276.1 |
| 8,282,052 B2* | 10/2012 | Huang | F16M 11/045 | 248/125.1 |
| 8,777,172 B2* | 7/2014 | Sapper | F16M 11/08 | 248/274.1 |
| 8,794,579 B2* | 8/2014 | Sturman | F16M 11/105 | 248/160 |
| 9,033,292 B2* | 5/2015 | Lu | F16M 13/022 | 248/123.11 |
| 9,357,846 B2* | 6/2016 | Hung | G06F 1/1601 | |
| 2002/0011544 A1* | 1/2002 | Bosson | F16M 11/041 | 248/121 |
| 2002/0079415 A1* | 6/2002 | Oddsen, Jr. | F16M 11/10 | 248/274.1 |
| 2002/0148936 A1* | 10/2002 | Oddsen, Jr. | F16M 11/2014 | 248/274.1 |
| 2003/0146359 A1* | 8/2003 | Oddsen, Jr. | F16M 11/2014 | 248/278.1 |
| 2004/0084587 A1* | 5/2004 | Oddsen | F16M 11/10 | 248/284.1 |
| 2005/0230585 A1* | 10/2005 | Hung | F16M 11/10 | 248/278.1 |
| 2006/0065795 A1* | 3/2006 | Blackburn | F16M 11/14 | 248/122.1 |
| 2006/0261228 A1* | 11/2006 | Hung | F16M 11/10 | 248/282.1 |
| 2007/0102607 A1* | 5/2007 | Koh | F16M 11/10 | 248/276.1 |
| 2007/0221794 A1* | 9/2007 | Li | F16M 11/10 | 248/124.1 |
| 2008/0029670 A1* | 2/2008 | Hung | F16M 11/10 | 248/278.1 |
| 2008/0135707 A1* | 6/2008 | Derry | F16M 11/10 | 248/278.1 |
| 2008/0185487 A1* | 8/2008 | Beger | F16M 11/10 | 248/220.21 |
| 2009/0134285 A1* | 5/2009 | Huang | F16M 11/08 | 248/124.1 |
| 2009/0212184 A1* | 8/2009 | Bourgeois | F16M 11/10 | 248/288.11 |
| 2011/0315843 A1* | 12/2011 | Hung | F16M 11/041 | 248/279.1 |
| 2012/0025037 A1* | 2/2012 | Chang | F16M 11/2014 | 248/124.1 |
| 2012/0193488 A1* | 8/2012 | Chung | F16M 11/10 | 248/201 |
| 2013/0119219 A1* | 5/2013 | Mifsud | F16M 13/022 | 248/276.1 |
| 2015/0342351 A1* | 12/2015 | Hung | G06F 1/1601 | 211/26 |

* cited by examiner

ADJUSTABLE DUAL-SCREEN MONITOR STAND

This application claims the priority benefit of Taiwan patent application number 105200027, filed on Jan. 4, 2016.

BACKGROUND OF THE INVENTION

1. Field of the Invention

The present invention relates to adjustable dual-screen monitor stand technology and more particularly to an adjustable dual-screen monitor stand, which comprises a base member having an upright post, two supporting bushing set mounted on the upright post of the base member at different elevations, and two cantilever swivel screen mounts respectively mounted on the supporting bushing sets to support a respective flat display monitor, allowing adjustment of the angular position of each flat display monitor individually.

2. Description of the Related Art

In the era of global technology advances, advanced and sophisticated electronic and electrical products have been continuously created. A television or computer uses a display monitor for video output. For the disadvantages of large size, poor picture quality and being incapable of receiving digital signals, the old CRT type display monitor has been gradually out of the market and replaced by a LCD or plasma type display monitor that has the advantages of having light and thin characteristics, good picture quality and being capable of receiving analog and digital signals. However, it is not easy to adjust the center of gravity of a display monitor having light and thin characteristics. When rotating or adjusting the angular position of a display monitor on a stand, it is very important to check the center of gravity of the display monitor, preventing forward or backward turnover of the display monitor. Further, the angle adjustment range of a display monitor on a conventional display monitor stand is quite narrow. Some people may directly affix a display monitor to an upright wall using a display monitor rack, preventing display monitor turnover. However, this mounting method does not allow adjustment of the angular position of the display monitor. Due to position and angle limitations, the application of the display monitor is limited. This method is normally used to affix a display monitor in a corner area in a room or building.

In the registration and payment counters in hospitals, bank and post office counters, ticket counters, offices, and many other places where multiple display monitors are used by various staffs at the same time, display monitor stands are provided to support individual display monitors for individual staffs. Because every single display monitor needs to be supported on one respective display monitor stand and because a relatively larger display monitor stand must be used for supporting a relatively larger display monitor, the installation of a large amount of display monitors in a counter or office occupies a large installation space, narrowing the available tabletop or desktop surface area and affecting the working of the staffs. Further, conventional display monitor stands do not allow a wide angle adjustment of the angular position of the supported display monitor. Further, there is limitation on the installation location of a conventional display monitor stand, making the application inconvenient. In a bank counter, post office counter or public organization counter, two display monitor stands may be arranged on the top of the counter to support two display monitors in reversed directions in front of each staff chair so that the staff can watch the displayed data on the inward-facing display monitor and the visitor can watch the displayed data on the outward-facing display monitor. However, the installation of two display monitors in one location occupies much the surface area of the top of the counter, narrowing the available surface area for application and bringing inconvenience.

Therefore, it is desirable to provide an adjustable display monitor stand, which is practical for supporting two display monitors, requires less installation surface space, and allows a wide angle adjustment of the supported display monitors.

SUMMARY OF THE INVENTION

The present invention has been accomplished under the circumstances in view. It is the main object of the present invention to provide an adjustable dual-screen monitor stand, which is simple and inexpensive to manufacture and practical for supporting two flat display monitors, allowing adjustment of the angular position of each supported flat display monitor individually, requiring less installation space, and preventing falling of the supported flat display monitor during angular position adjustment.

To achieve this and other objects of the present invention, an adjustable dual-screen monitor stand comprises a base member having an upright post, a supporting bushing set comprising an upper bushing and a lower bushing mounted on the upright post of the base at different elevations, a first cantilever swivel screen mount comprising a first lower swivel arm, a first upper swivel arm and a first screen holder pivotally coupled to one another and pivotally supported on the upper bushing to hold a first flat display monitor, allowing adjustment of the angular position of the supported first flat display monitor, and a second cantilever swivel screen mount comprising a second lower swivel arm, a second upper swivel arm and a second screen holder pivotally coupled to one another and pivotally supported on the lower bushing to hold a second flat display monitor, allowing adjustment of the angular position of the supported second flat display monitor. The supporting bushing set and the first and second cantilever swivel screen mounts are simple in structure, facilitating fabrication, installation and adjustment of the angular position of each supported flat display monitor.

Further, the base member comprises an anchoring component located at a bottom side thereof. Thus, the adjustable dual-screen monitor stand can be conveniently fastened to the tabletop of a table or the desktop of a desk using the anchoring component. Further, stop designs are provided in the upper and lower bushings of the supporting bushing set and the upper and lower swivel arms of the first and second cantilever swivel screen mounts, limiting the angle of rotation of the upper and lower swivel arms relative to the upper and lower bushings and avoiding forward or backward falling of the flat display monitors that are respectively mounted on the first and second screen holders of the first and second cantilever swivel screen mounts. The ergonomic design of the supporting bushing set facilitates adjustment of the angular positions of the first and second cantilever swivel screen mounts relative to the upright post of the base member.

Further, the first and second cantilever swivel screen mounts are respectively and angularly adjustably mounted on the upper and lower bushings of the supporting bushing set to hold the respective flat display monitors on the first and second screen holders, allowing adjustment of the angular positions of the two supported flat display monitors in the same direction or in different directions. The upper and lower bushings of the supporting bushing set share the same base member for supporting the first and second cantilever swivel screen mounts, saving much tabletop or desktop surface area.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
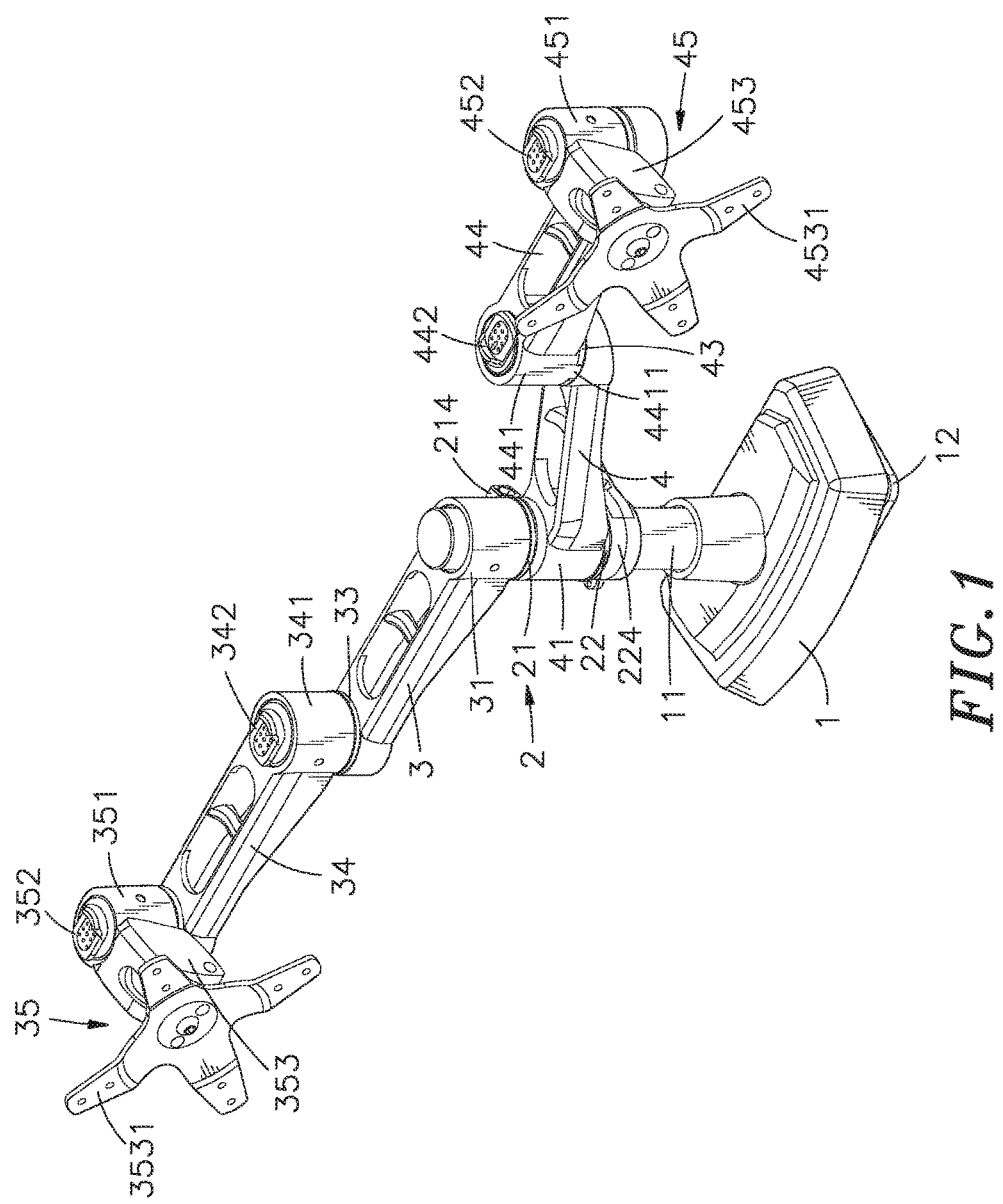
FIG. 1 is an oblique top elevational view of an adjustable dual-screen monitor stand in accordance with the present invention.
Figure 2:
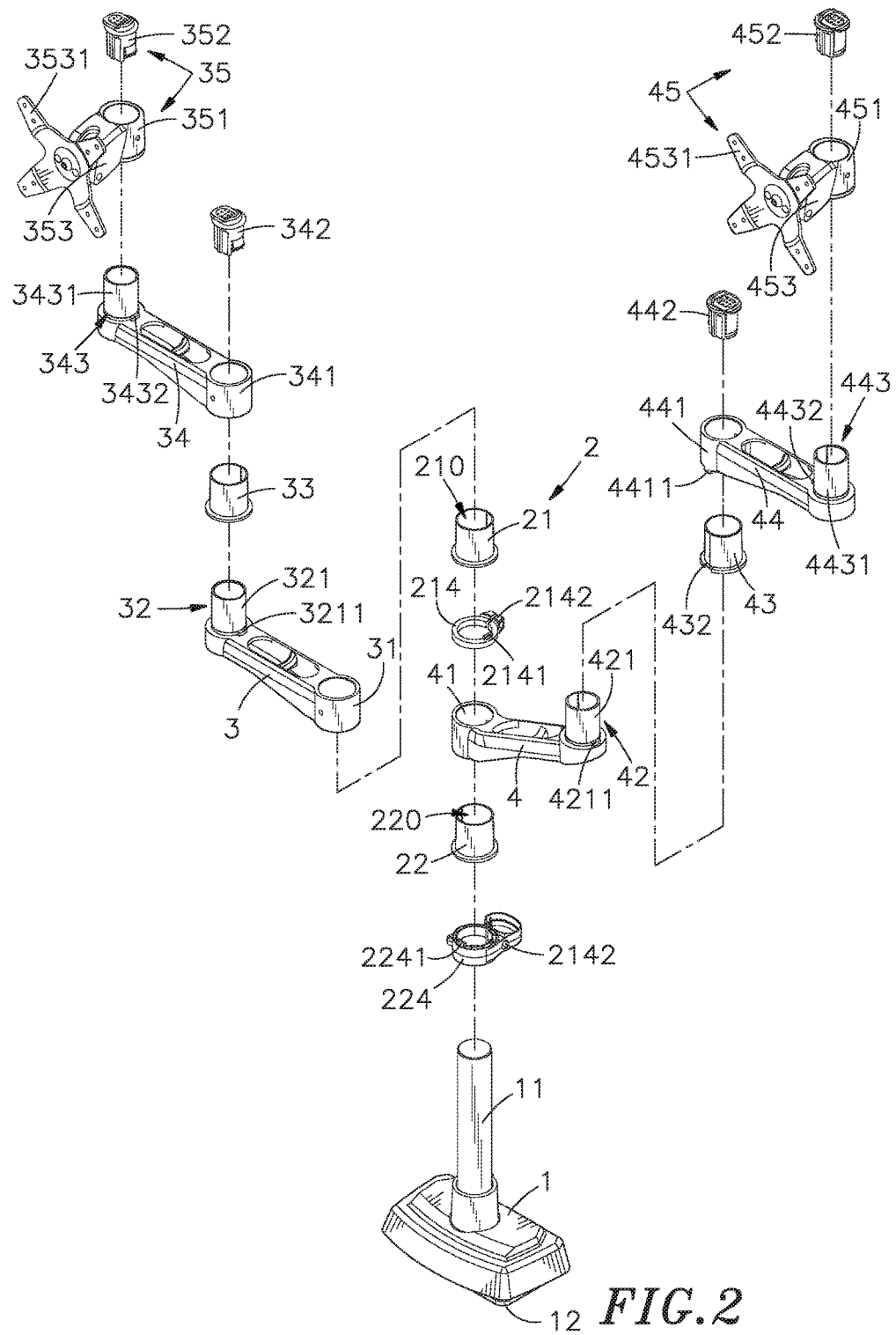
FIG. 2 is an exploded view of the adjustable dual-screen monitor stand in accordance with the present invention.
Figure 3:
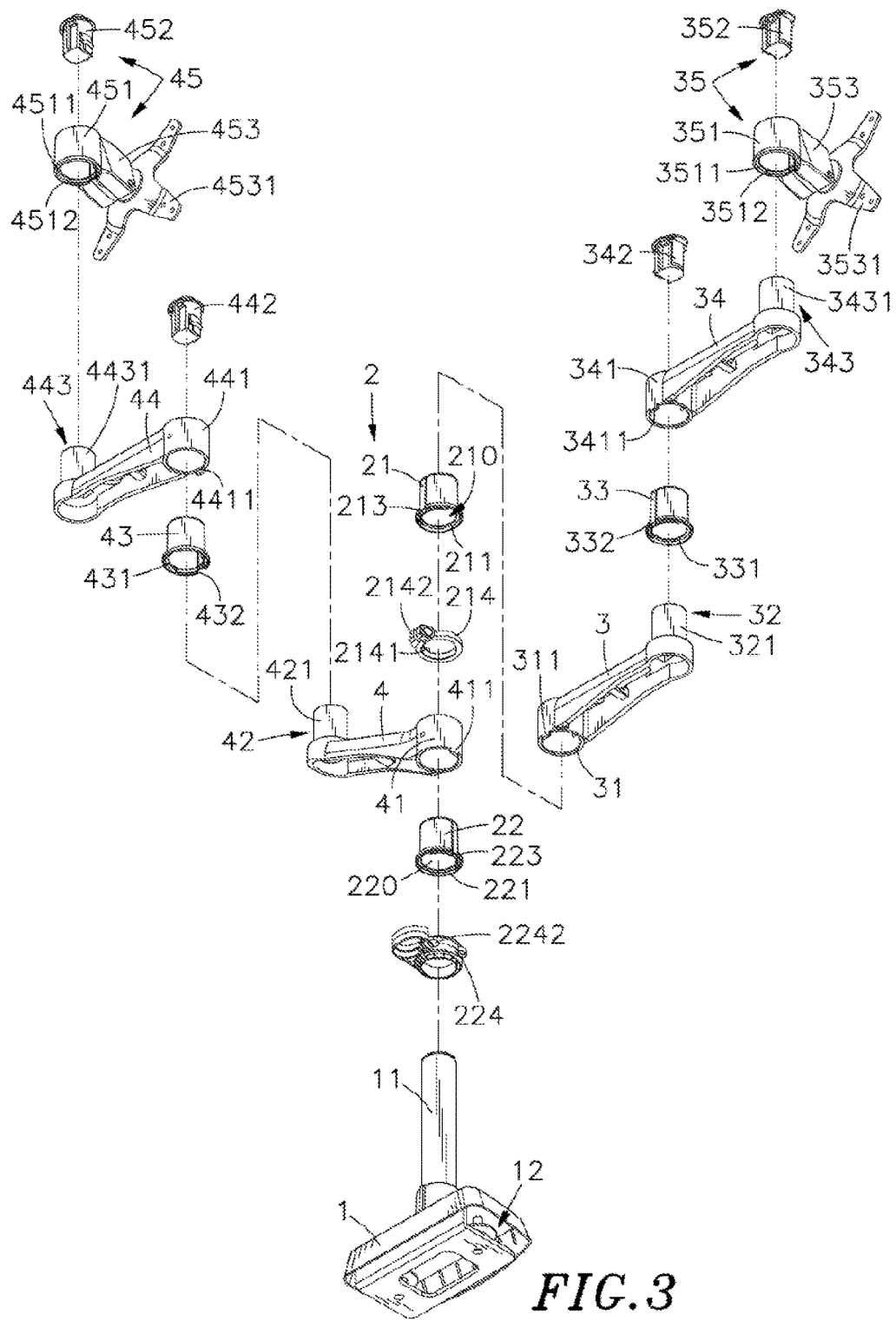
FIG. 3 corresponds to FIG. 2 when viewed from another angle.
Figure 4:
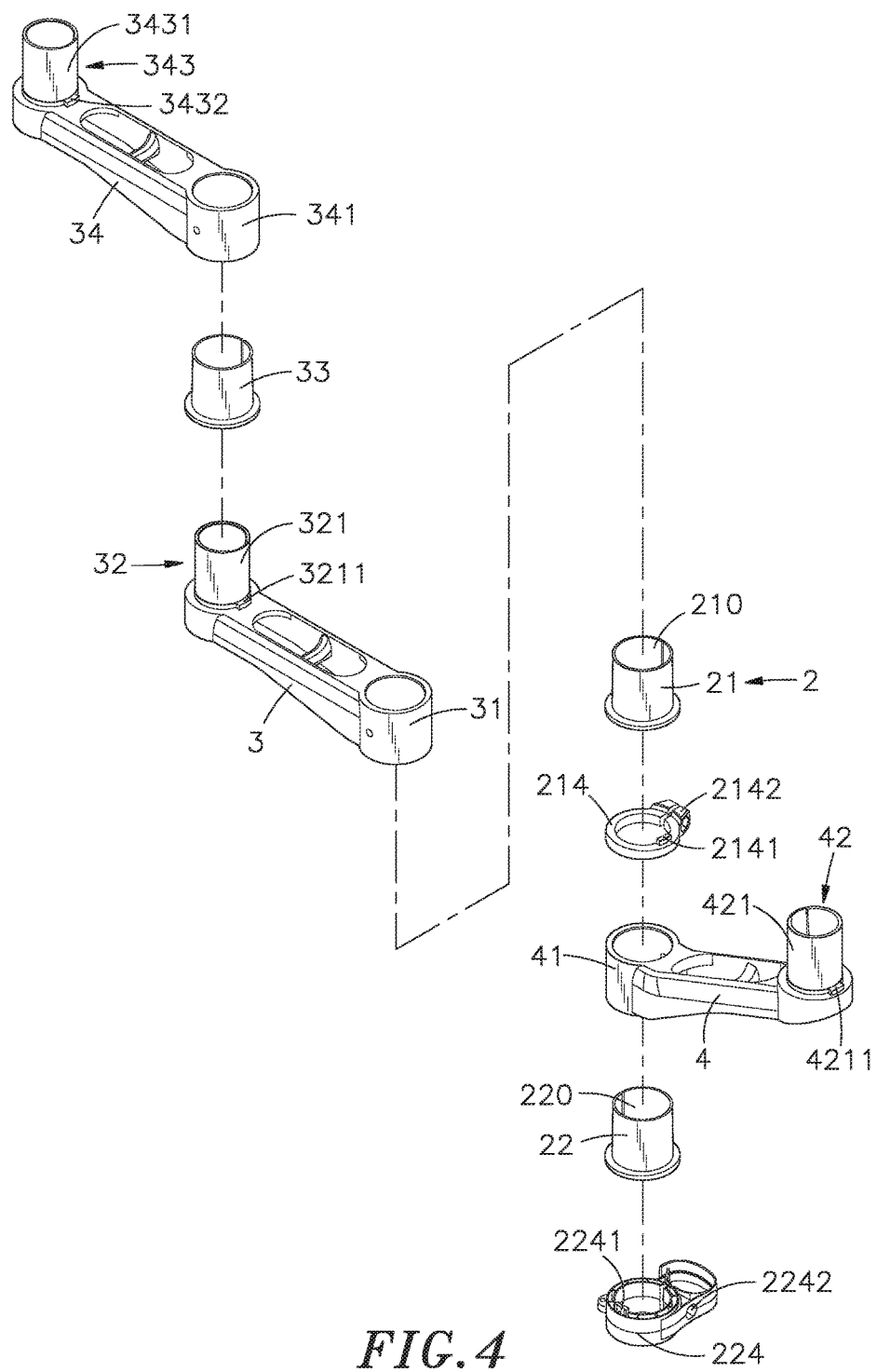
FIG. 4 is an exploded view of the supporting bushing set of the adjustable dual-screen monitor stand in accordance with the present invention.
Figure 5:
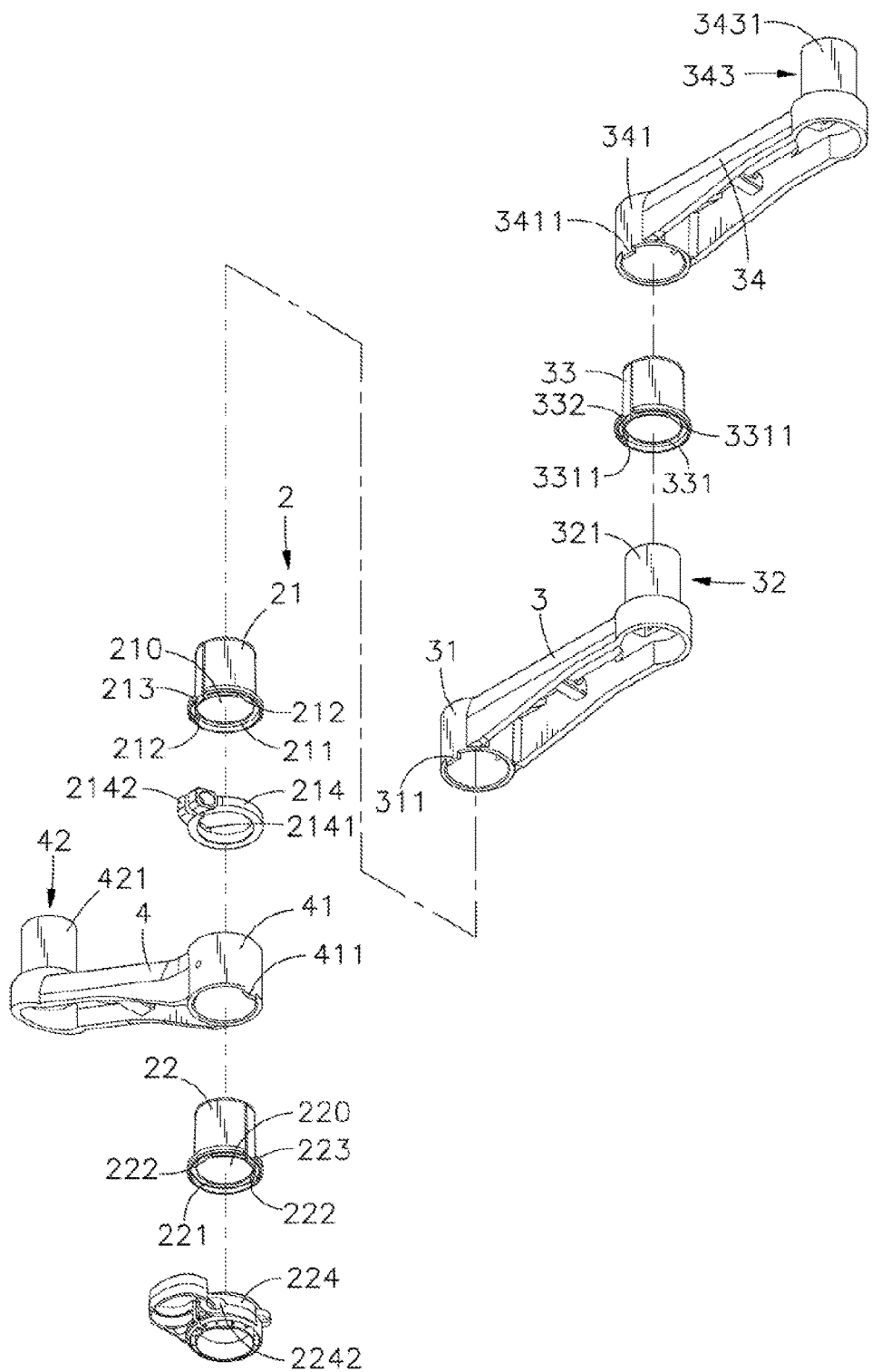
FIG. 5 corresponds to FIG. 4 when viewed from another angle.
Figure 6:
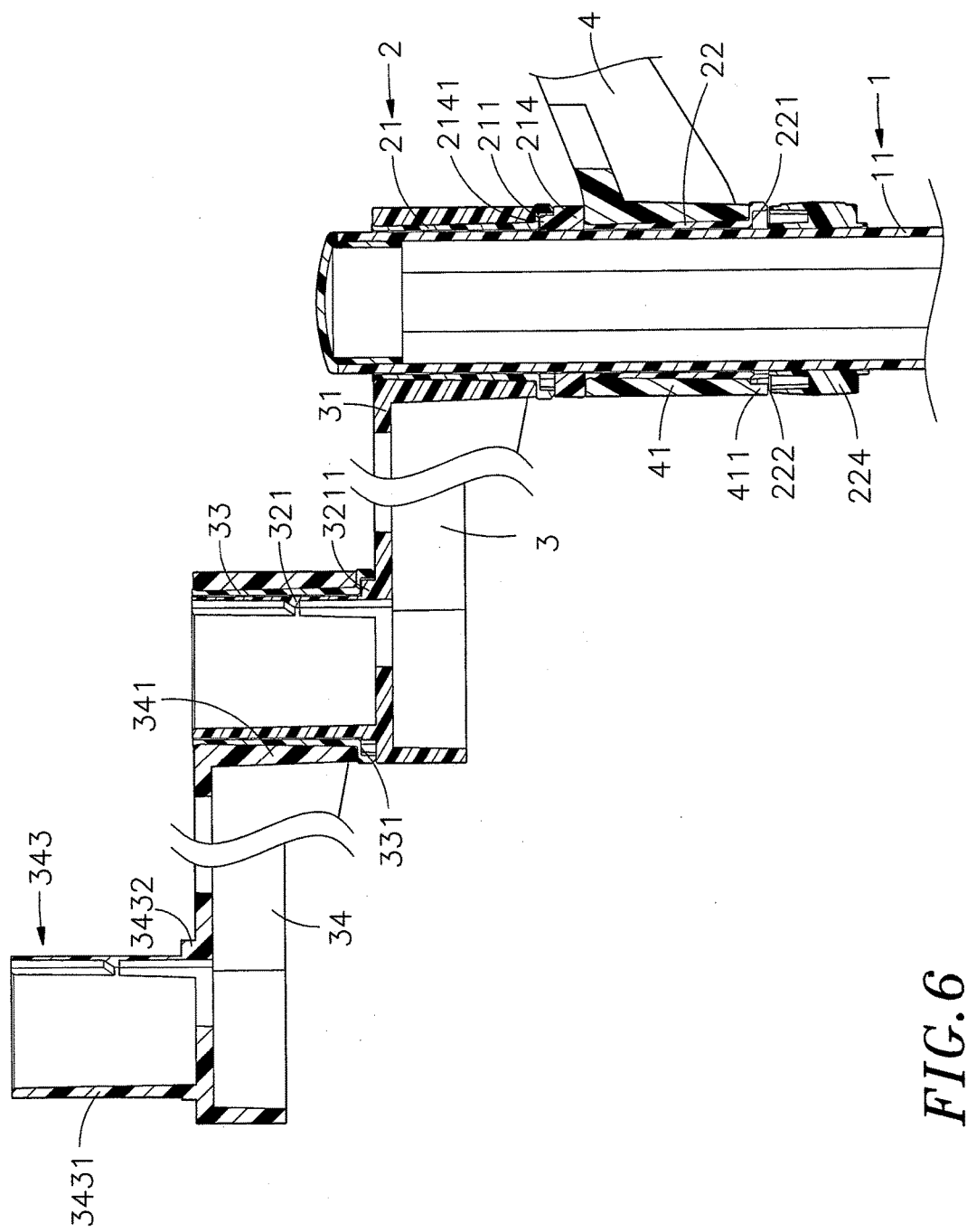
FIG. 6 is a sectional side view of the supporting bushing set of the adjustable dual-screen monitor stand in accordance with the present invention.

Referring to FIGS. 1-6 and 9, an adjustable dual-screen monitor stand in accordance with the present invention is shown. The adjustable dual-screen monitor stand comprises a base member 1 and a supporting bushing set 2.

The base member 1 comprises an upright post 11 at a top side thereof and an anchoring component 12 at an opposing bottom side thereof.

The supporting bushing set 2 comprises an upper bushing 21, a lower bushing 22, an upper position-limiter 214, and a lower position-limiter 224. The upper bushing 21 and the lower bushing 22 are mounted around the upright post 11 of the base member 1 and arranged in a stack. The upper bushing 21 comprises an upper axle hole 210 axially extended through opposing top and bottom sides thereof, an upper coupling groove 211 extended around an inner wall of the bottom side, two upper stop flanges 212 located in the upper coupling groove 211 at two opposite sides, and a first lower engagement groove 213 located on an outer wall of the bottom side. The lower bushing 22 comprises a lower axle hole 220 axially extended through opposing top and bottom sides thereof, a lower coupling groove 221 extended around an inner wall of the bottom side, two lower stop flanges 222 located in the lower coupling groove 221 at two opposite sides, and a second lower engagement groove 223 located on an outer wall of the bottom side. The upper position-limiter 214 and the lower position-limiter 224 are mounted around the upright post 11 of the base member 1 and respectively attached to the bottom side of the upper bushing 21 and the bottom side of the lower bushing 22. The upper position-limiter 214 comprises an upper stop rod 2141 and an upper binding device 2142. The lower position-limiter 224 comprises a lower stop rod 2241 and a lower binding device 2242. The upper stop rod 2141 of the upper position-limiter 214 and the lower stop rod 2241 of the lower position-limiter 224 are respectively coupled to the upper coupling groove 211 of the upper bushing 21 and the lower coupling groove 221 of the lower bushing 22 and stoppable at one of the upper stop flanges 212 or lower stop flanges 222, enabling the upper bushing 21 and the lower bushing 22 to be respectively rotated relative to the upper position-limiter 214 and the lower position-limiter 224 within a predetermined angle. By means of the upper binding device 2142 and the lower binding device 2242, the upper position-limiter 214 and the lower position-limiter 224 can be fastened tight to the upright post 11 of the base member 1, or loosened for angular position adjustment.

The adjustable dual-screen monitor stand further comprises a first cantilever swivel screen mount 3 and a second cantilever swivel screen mount 4. The first cantilever swivel screen mount 3 is mounted on the upper bushing 21 of the supporting bushing set 2. The first cantilever swivel screen mount 3 comprises a first lower swivel arm 31 turnably coupled with an inner end thereof to the upper bushing 21 and having a first lower engagement block 311 downwardly protruded from a bottom side of the inner end for engaging into the first lower engagement groove 213 of the upper bushing 21 to secure the first lower swivel arm 31 to the upper bushing 21 positively and a first lower mating connection member 32 that comprises a first lower supporting shaft 321 fixedly located at an opposite outer end of the first lower swivel arm 31 and a first lower stop rod 3211 protruded from the periphery of a bottom side of the first lower supporting shaft 321, a first bushing 33 rotatably sleeved onto the first lower supporting shaft 321 and comprising a first upper coupling groove 331 extended around an inside wall of a bottom side thereof and coupled to the first lower stop rod 3211 of the first lower supporting shaft 321, two first stop flanges 3311 located in the first upper coupling groove 331 at two opposite sides and selectively stoppable against the first lower stop rod 3211 of the first lower supporting shaft 321 in the first upper coupling groove 331 and a first upper engagement groove 332 located on an outer wall of the bottom side of the first bushing 33, a first upper swivel arm 34, which comprises a first barrel 341 located at an inner end thereof and turnably coupled to the first bushing 33, a first upper engagement block 3411 downwardly protruded from a bottom side of the inner end for engaging into the first upper engagement groove 332 of the first bushing 33 to secure the first upper swivel arm 34 to the first bushing 33 positively, a first retaining member 342 mounted in a top side of the first barrel 341 to prevent falling of the first barrel 341 out of the upper bushing 33 and a first upper mating connection member 343 that comprises a first upper supporting shaft 3431 fixedly located at an opposing outer end of the first upper swivel arm 34 remote from the first barrel 341 and a first upper stop rod 3432 protruded from the periphery of a bottom side of the first upper supporting shaft 3431, and a first screen holder 35 for holding one respective flat display monitor. The first screen holder 35 comprises a first mounting sleeve 351 rotatably sleeved onto the first upper supporting shaft 3431, a first annular coupling groove 3511 located in a bottom side of the first mounting sleeve 351 and coupled to the first upper stop rod 3432 at the first upper supporting shaft 3431, two first annular inner flanges 3512 located in the first annular coupling groove 3511 at two opposite sides and selectively stoppable at the first upper stop rod 3432, a third retaining member 352 mounted in an opposing top side of the first mounting sleeve 351 to prevent falling of the first mounting sleeve 351 out of the first upper supporting shaft 3431, a first supporting stem 353 radially extended from the periphery of the first mounting sleeve 351, and a plurality of first wind plates 3531 radially extended from a distal end of the supporting stem 353 and adapted for the fixation of a flat display monitor 5.

The second cantilever swivel screen mount 4 is mounted on the lower bushing 22 of the supporting bushing set 2. The second cantilever swivel screen mount 4 comprises a second lower swivel arm 41 turnably coupled with an inner end thereof to the lower bushing 22 and having a second lower engagement block 411 downwardly protruded from a bottom side of the inner end for engaging into the second lower engagement groove 223 of the lower bushing 22 to secure the second lower swivel arm 41 to the lower bushing 22 positively and a second lower mating connection member 42 that comprises a second lower supporting shaft 421 fixedly located at an opposite outer end of the second lower swivel arm 41 and a second lower stop rod 4211 protruded from the periphery of a bottom side of the second lower supporting shaft 421, a second bushing 43 rotatably sleeved onto the second lower supporting shaft 421 and comprising a second upper coupling groove 431 extended around an inside wall of a bottom side thereof and coupled to the second lower stop rod 4211 of the second lower supporting shaft 421, two second stop flanges 4311 located in the second upper coupling groove 431 at two opposite sides and selectively stoppable against the second lower stop rod 4211 of the second lower supporting shaft 421 in the second upper coupling groove 431 and a second upper engagement groove 432 located on an outer wall of the bottom side of the second bushing 43, a second upper swivel arm 44, which comprises a second barrel 441 located at an inner end thereof and turnably coupled to the second bushing 43, a second upper engagement block 4411 downwardly protruded from a bottom side of the inner end for engaging into the first upper engagement groove 432 of the second bushing 43 to secure the second upper swivel arm 44 to the second bushing 43 positively, a second retaining member 442 mounted in a top side of the second barrel 441 to prevent falling of the second barrel 441 out of the second bushing 43 and a second upper mating connection member 443 that comprises a second upper supporting shaft 4431 fixedly located at an opposing outer end of the second upper swivel arm 44 remote from the second barrel 441 and a second upper stop rod 4432 protruded from the periphery of a bottom side of the second upper supporting shaft 4431, and a second screen holder 45 for holding one respective flat display monitor 5. The second screen holder 45 comprises a second mounting sleeve 451 rotatably sleeved onto the second upper supporting shaft 4431, a second annular coupling groove 4511 located in a bottom side of the second mounting sleeve 451 and coupled to the second upper stop rod 4432 at the second upper supporting shaft 4431, two second annular inner flanges 4512 located in the second annular coupling groove 4511 at two opposite sides and selectively stoppable at the second upper stop rod 4432, a fourth retaining member 452 mounted in an opposing top side of the second mounting sleeve 451 to prevent falling of the second mounting sleeve 451 out of the second upper supporting shaft 4431, a second supporting stem 453 radially extended from the periphery of the second mounting sleeve 451, and a plurality of second wind plates 4531 radially extended from a distal end of the supporting stem 453 and adapted for the fixation of a flat display monitor 5.

When assembling the adjustable dual-screen monitor stand, mount the lower position-limiter 224, the lower bushing 22, the upper position-limiter 214 and the upper bushing 21 on the upright post 11 of the base member 1 in a proper order, and then fasten up the upper binding device 2141 of the upper position-limiter 214 and the lower binding device 2241 of the lower position-limiter 224 to lock the lower position-limiter 224 and the upper position-limiter 214 to the upright post 11 of the base member 1, and then respectively mount the first cantilever swivel screen mount 3 on the upper bushing 21 and the second cantilever swivel screen mount 4 on the lower bushing 22, allowing adjustment of the angular position of the first cantilever swivel screen mount 3 on the upper bushing 21 and the angular position of the second cantilever swivel screen mount 4 on the lower bushing 22 by means of biasing the first barrel 341 of the first upper swivel arm 34 of the first cantilever swivel screen mount 3 relative to the first lower mating connection member 32 and biasing the first mounting sleeve 351 of the first screen holder 35 relative to the first upper mating connection member 343 of the first upper swivel arm 34 and by means of biasing the second barrel 441 of the second upper swivel arm 44 of the second cantilever swivel screen mount 4 relative to the second lower mating connection member 42 and biasing the second mounting sleeve 451 of the second screen holder 45 relative to the second upper mating connection member 443 of the second upper swivel arm 44. Thus, the base member 1, the supporting bushing set 2, the first cantilever swivel screen mount 3 and the second cantilever swivel screen mount 4 are assembled to constitute the adjustable dual-screen monitor stand of the present invention.

The first cantilever swivel screen mount 3 and the second cantilever swivel screen mount 4 are substantially similar in structure, i.e., the second lower swivel arm 41, second lower mating connection member 42, first bushing 43, second upper swivel arm 44 and second screen holder 45 of the second cantilever swivel screen mount 4 are designed and arranged corresponding to the first lower swivel arm 31, first lower mating connection member 32, first bushing 33, first upper swivel arm 34 and first screen holder 35 of the first cantilever swivel screen mount 3, facilitating fabrication and installation, saving installation labor and time and reducing the manufacturing cost.

Figure 7:
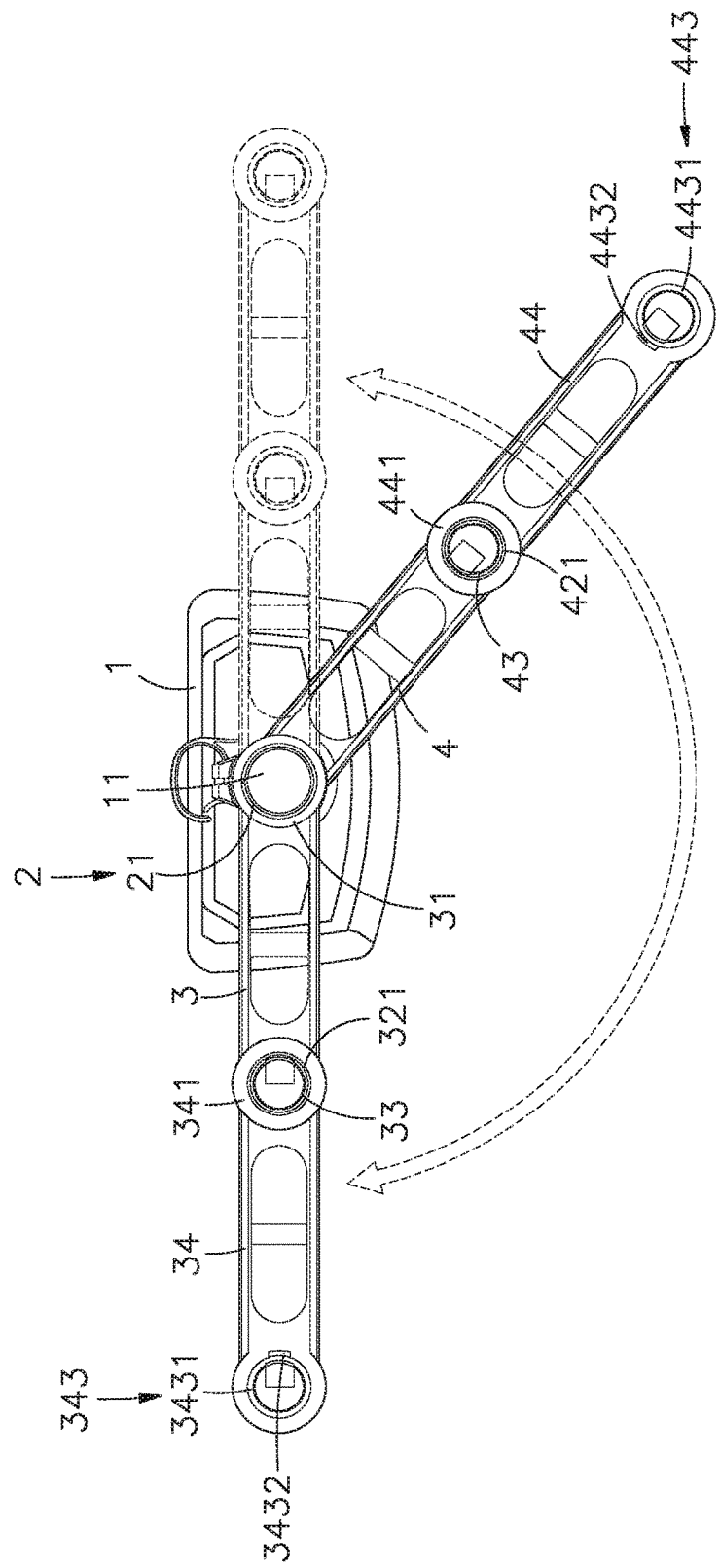
FIG. 7 is a schematic top view illustrating an adjustment operation of the adjustable dual-screen monitor stand in accordance with the present invention.
Figure 8:
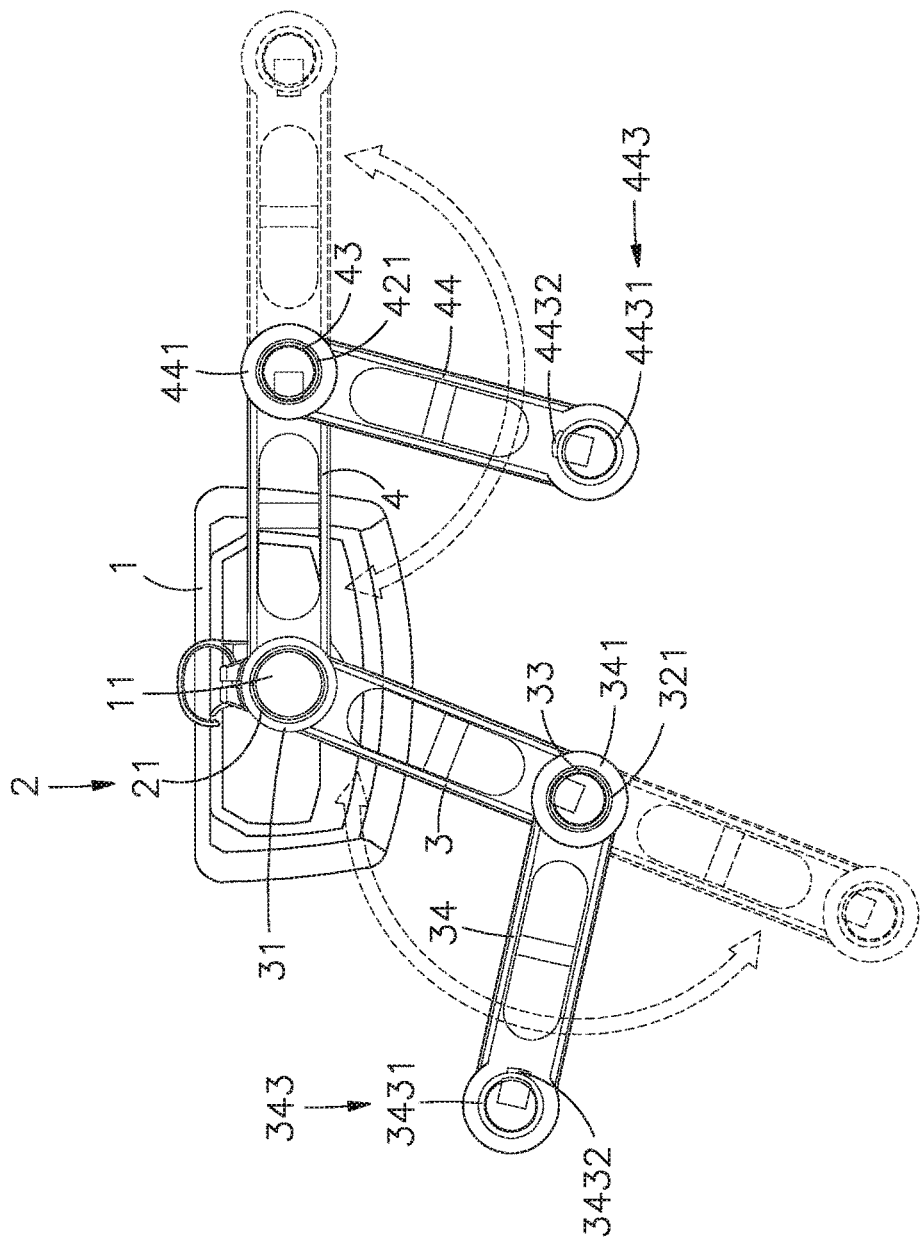
FIG. 8 is a schematic top view illustrating another adjustment operation of the adjustable dual-screen monitor stand in accordance with the present invention.
Figure 9:
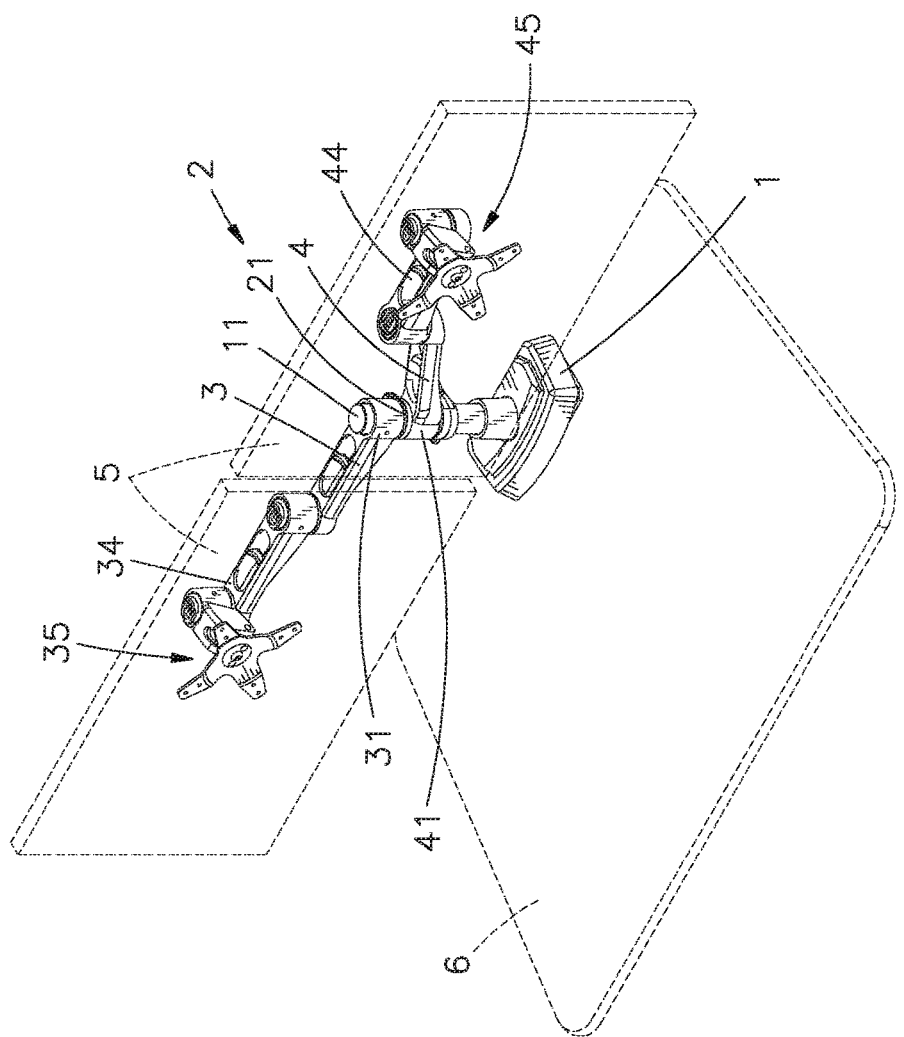
FIG. 9 is an applied view of the adjustable dual-screen monitor stand in accordance with the present invention.

Referring to FIGS. 7-8, FIGS. 2-5 and 9 again, in the adjustable dual-screen monitor stand, the upper position-limiter 214 and the lower position-limiter 224 are respectively mounted around the upright post 11 of the base member 1 and locked thereto to support the upper bushing 21 and lower bushing 22 of the supporting bushing set 2 at different elevations; the first cantilever swivel screen mount 3 and the second cantilever swivel screen mount 4 are respectively mounted on the upper bushing 21 and lower bushing 22 of the supporting bushing set 2, allowing the first lower swivel arm 31 or second lower swivel arm 41 to be turned about the upper bushing 21 or lower bushing 22, the first upper swivel arm 34 or second upper swivel arm 44 to be turned about the first lower mating connection member 32 or second lower mating connection member 42 and the first screen holder 35 or second screen holder 45 to be turned about the first upper mating connection member 343 or second upper mating connection member 443

When rotating the upper bushing 21 or lower bushing 22 clockwise or counter-clockwise relative to the upper position-limiter 214 or lower position-limiter 224, one of the two upper stop flanges 212 or lower stop flanges 222 in the upper coupling groove 211 or lower coupling groove 221 will be moved into abutment against the upper stop rod 2141 of the upper position-limiter 214 or the lower stop rod 2241 of the lower position-limiter 224, and thus, the turning angle of the first lower swivel arm 31 of the first cantilever swivel screen mount 3 and the turning angle of the second lower swivel arm 41 of the second cantilever swivel screen mount 4 relative to the upright post 11 can be limited to about 180 degrees (see FIG. 7).

Further, when turning the first upper swivel arm 34 of the first cantilever swivel screen mount 3 or the first bushing second upper swivel arm 44 of the second cantilever swivel screen mount 4 about the first bushing 33 at the first lower mating connection member 32 or the second bushing 43 at the second lower mating connection member 42, one of the two first stop flanges 3311 or second stop flanges 4311 in the first upper coupling groove 331 or second upper coupling groove 431 will be moved into abutment against the first lower stop rod 3211 of the first lower supporting shaft 321 or the second lower stop rod 4211 of the second lower supporting shaft 421, and thus, the turning angle of the first upper swivel arm 34 of the first cantilever swivel screen mount 3 relative to the first lower mating connection member 32 and the turning angle of the second upper swivel arm 44 of the second cantilever swivel screen mount 4 relative to the second lower mating connection member 42 can be limited to about 180 degrees (see FIG. 8).

Further, when turning the first second mounting sleeve 351 of the first screen holder 35 clockwise or counter-clockwise about the first upper mating connection member 343 at the first upper swivel arm 34 or turning the second mounting sleeve 451 of the second screen holder 45 clockwise or counter-clockwise about the second upper mating connection member 443 at the second upper swivel arm 44, one of the two first annular inner flanges 3512 or second annular inner flanges 4512 in the first annular coupling groove 3511 inside the first second mounting sleeve 351 or in the second annular coupling groove 4511 inside the second mounting sleeve 451 will be moved into abutment against the first upper stop rod 3432 or second upper stop rod 4432, and thus, the turning angle of the first screen holder 35 relative to the first upper mating connection member 343 and the turning angle of the second screen holder 45 relative to the second upper mating connection member 443 can be limited to about 180 degrees. Further, two flat display monitors 5 can be respectively affixed to the first wind plates 3531 at the distal end of the first supporting stem 353 of the first screen holder 35 and the second wind plates 4531 at the distal end of the second supporting stem 453 of the second screen holder 45. Further, the base member 1 can be fastened to one peripheral side of a tabletop (or desktop) 6 using the anchoring component 12. Thus, the adjustable dual-screen monitor stand can be conveniently mounted at one peripheral side of the tabletop (or desktop) 6 to support two flat display monitors 5 in an adjustable manner, saving much tabletop (desktop) space.

Further, when biasing the first lower swivel arm 31 (or second lower swivel arm 41) and the first upper swivel arm 34 (or second upper swivel arm 44) of the first or second cantilever swivel screen mount 3 or 4 to turn the upper bushing 21 (or lower bushing 22) of the supporting bushing set 2 about the upright post 11 for adjusting the angular position of the respective flat display monitor 5, the upper coupling groove 211 (or lower coupling groove 221) of the upper bushing 21 (or lower bushing 22) is turned relative to the upper position-limiter 214 (or lower position-limiter 224), moving one of the upper stop flanges 212 (or lower stop flanges 222) in the upper coupling groove 211 (or lower coupling groove 221) into abutment against the upper stop rod 2141 (or lower stop rod 2241) of the upper position-limiter 214 (or lower position-limiter 224). Further, when adjusting the angular position of each supported flat display monitor 5, the first lower swivel arm 31 (or second lower swivel arm 41) of the first or second cantilever swivel screen mount 3 or 4 can be turned about the upper bushing 21 (or lower bushing 22) of the supporting bushing set 2, the first upper swivel arm 34 (or second upper swivel arm 44) of the first or second cantilever swivel screen mount 3 or 4 can be turned about the first lower mating connection member 32 (or second lower mating connection member 42), and the first mounting sleeve 351 (or second mounting sleeve 451) of the first screen holder 35 (or second screen holder 45) can be turned about the first upper mating connection member 343 (or second upper mating connection member 443), preventing forward or backward turnover of the flat display monitor 5. In general, the first cantilever swivel screen mount 3 and the second cantilever swivel screen mount 4 have a simple structure of good ergonomic design, and can be conveniently mounted on the upper bushing 21 and lower bushing 22 of the supporting bushing set 2 at the upright post 11 of the base member 1, facilitating adjustment of the angular position of each supported flat display monitor 5 individually.

As described above, in the adjustable dual-screen monitor stand of the invention, the upper and lower bushings 21, 22 of the supporting bushing set 2 are mounted on the upright post 11 of the base member 1 at different elevations to support the first lower swivel arm 31 and second lower swivel arm 41 of the first and second cantilever swivel screen mounts 3, 4 respectively in a pivotable manner, allowing adjustment of the angular positions of the first lower swivel arm 31 and second lower swivel arm 41 relative to the upper and lower bushings 21, 22, the angular positions of the first upper swivel arm 34 and second upper swivel arm 44 relative to the first lower swivel arm 31 and second lower swivel arm 41 and the angular positions of the first screen holder 35 and second screen holder 45 relative to the first upper swivel arm 34 and second upper swivel arm 44 respectively within 180 degrees, avoiding forward or backward falling of the flat display monitors 5 that are respectively affixed to the first and second screen holder 35, 45 of the first and second cantilever swivel screen mounts 3, 4. Further, the upper and lower bushings 21, 22 of the supporting bushing set 2 are substantially similar in structural design and the first and second cantilever swivel screen mounts 3, 4 are also substantially similar in structural design, facilitating fabrication and installation.

In conclusion, the invention provides an adjustable dual-screen monitor stand, which comprises a base member having an upright post, a supporting bushing set comprising upper and lower bushings mounted on the upright post of the base member at different elevations, a first cantilever swivel screen mount comprising a first lower swivel arm coupled to the lower bushing and biasable leftwards and rightwards relative to the lower bushing within 180°, a first upper swivel arm coupled to the first lower swivel arm and biasable leftwards and rightwards relative to the first lower swivel arm within 180° and a first screen holder coupled to the first upper swivel arm for holding one respective flat display monitor and biasable leftwards and rightwards relative to the first upper swivel arm within 180°, and a second cantilever swivel screen mount comprising a second lower swivel arm coupled to the lower bushing and biasable leftwards and rightwards relative to the lower bushing within 180°, a second upper swivel arm coupled to the second lower swivel arm and biasable leftwards and rightwards relative to the second lower swivel arm within 180° and a second screen holder coupled to the second upper swivel arm for holding one respective flat display monitor and biasable leftwards and rightwards relative to the second upper swivel arm within 180°. The first and second cantilever swivel screen mounts are substantially similar in structural design, facilitating fabrication and installation.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable dual-screen monitor stand, comprising:
a base member comprising an upright post at a top side thereof and an anchoring component at a bottom side thereof;
a supporting bushing set comprising an upper bushing and a lower bushing mounted on said upright post which is secured on the top side of said base member at different elevations;
a first cantilever swivel screen mount comprising a first lower swivel arm mounted on and turnable about said upper bushing, a first lower mating connection member located at a distal end of said first lower swivel arm remote from said upper bushing, a first upper swivel arm mounted on and turnable about said first lower mating connection member, a first upper mating connection member located at a distal end of said first upper swivel arm, and a first screen holder mounted on and turnable about said first upper mating connection member and adapted for holding a first flat display monitor; and
a second cantilever swivel screen mount comprising a second lower swivel arm mounted on and turnable about said upper bushing, a second lower mating connection member located at a distal end of said second lower swivel arm remote from said lower bushing, a second upper swivel arm mounted on and turnable about said second lower mating connection member, a second upper mating connection member located at a distal end of said second upper swivel arm, and a second screen holder mounted on and turnable about said second upper mating connection member and adapted for holding a second flat display monitor,
wherein said upper bushing further comprises a first lower engagement groove; said first lower swivel arm further comprises a first lower engagement block downwardly protruded from a bottom side of an inner end of said first lower swivel arm for engaging into said first lower engagement groove of said upper bushing to secure said first lower swivel arm to said upper bushing positively; said lower bushing further comprises a second lower engagement groove; said first upper swivel arm further comprises a first upper engagement block downwardly protruded from a bottom side of an inner end of said first upper swivel arm for engaging into said first upper engagement groove of a first bushing to secure said first upper swivel arm to said first bushing positively.

2. The adjustable dual-screen monitor stand as claimed in claim 1, wherein said upper bushing of said supporting bushing set comprises an upper axle hole coupled to said upright post of said base member and positioned on a top side of an upper position-limiter, and an upper coupling groove extended around an inner wall of a bottom side of said upper bushing; said upper position-limiter comprises an upper stop tab coupled to said upper coupling groove of said upper bushing; said lower bushing of said supporting bushing set comprises a lower axle hole coupled to said upright post of said base member and positioned on a top side of a lower position-limiter, and a lower coupling groove extended around an inner wall of a bottom side of said lower bushing; said lower position-limiter comprises a lower stop tab coupled to said lower coupling groove of said lower bushing.

3. The adjustable dual-screen monitor stand as claimed in claim 2, wherein said upper bushing further comprises two upper stop flanges located in said upper coupling groove at two respective opposite sides and selectively stoppable against said upper stop tab to limit the rotation of said upper bushing relative to said upper position-limiter; said lower bushing further comprises two lower stop flanges located in said lower coupling groove at two opposite respective sides and selectively stoppable against said lower stop tab to limit the rotation of said lower bushing relative to said lower position-limiter.

4. The adjustable dual-screen monitor stand as claimed in claim 1, wherein said first cantilever swivel screen mount further comprises a first bushing mounted between said first lower mating connection member and said first upper swivel arm; said second cantilever swivel screen mount further comprises a second bushing mounted between said second lower mating connection member and said second upper swivel arm.

5. The adjustable dual-screen monitor stand as claimed in claim 4, wherein said first lower mating connection member comprises a first lower supporting shaft fixedly located at an outer end of said first lower swivel arm and a first lower stop tab protruded from a periphery of a bottom side of said first lower supporting shaft; said first bushing comprising a first upper coupling groove extended around an inside wall of a bottom side thereof is rotatably sleeved onto said first lower supporting shaft and coupled to said first lower stop tab; two first stop flanges are located in said first upper coupling groove at two opposite respective sides and selectively stoppable against said first lower stop tab; said second lower mating connection member comprises a second lower supporting shaft fixedly located at an outer end of said second lower swivel arm and a second lower stop tab protruded from the periphery of a bottom side of said second lower supporting shaft; said second bushing comprising a second upper coupling groove extended around an inside wall of a bottom side thereof is rotatably sleeved onto said second lower supporting shaft and coupled to said second lower stop tab; two second stop flanges are located in said second upper coupling groove at two opposite respective sides and selectively stoppable against said second lower stop tab.

6. The adjustable dual-screen monitor stand as claimed in claim 4, wherein a first bushing comprising a first upper engagement groove located on an upper wall of the bottom side of the first bushing, said first upper swivel arm comprises a first barrel turnably coupled to said first bushing, a first upper engagement block for engaging into said first upper engagement groove of the first bushing to secure said first upper swivel arm to said first bushing positively, and a first retaining member mounted in a top side of said first barrel to prevent falling of said first barrel out of said upper bushing; a second upper eng_q_gement groove located on an outer wall of the bottom side of the second bushing; said second upper swivel arm comprises a second barrel turnably coupled to said second bushing, a second upper engagement block for engaging into said second upper engagement groove of said second bushing to secure said second upper swivel arm to said second bushing positively, and a second retaining member mounted in a top side of said second barrel to prevent falling of said second barrel out of said second bushing.

7. The adjustable dual-screen monitor stand as claimed in claim 1, wherein said first upper mating connection member comprises a first upper supporting shaft fixedly located at an outer end of said first upper swivel arm and a first upper stop tab protruded from the periphery of a bottom side of said first upper supporting shaft; said first screen holder comprises a first mounting sleeve rotatably sleeved onto said first upper supporting shaft, a first annular coupling groove located in a bottom side of said first mounting sleeve and coupled to said first upper stop tab, two first annular inner flanges located in said first annular coupling groove at two respective opposite sides for selectively stoppable against said first upper stop tab; said second upper mating connection member comprises a second upper supporting shaft fixedly located at an outer end of said second upper swivel arm and a second upper stop tab protruded from the periphery of a bottom side of said second upper supporting shaft; said second screen holder comprises a second mounting sleeve rotatably sleeved onto said second upper supporting shaft, a second annular coupling groove located in a bottom side of said second mounting sleeve and coupled to said second upper stop tab, two second annular inner flanges located in said second annular coupling groove at two respective opposite sides for selectively stoppable against said second upper stop tab.

8. The adjustable dual-screen monitor stand as claimed in claim 1, wherein
said first screen holder comprises a first mounting sleeve pivotally coupled to said first upper swivel arm, a first supporting stem outwardly extended from the periphery of said first mounting sleeve, and a plurality of first wind plates radially extended from a distal end of said first supporting stem for the fixation of the first flat display monitor;
said second screen holder comprises a second mounting sleeve pivotally coupled to said second upper swivel arm, a second supporting stem outwardly extended from the periphery of said second mounting sleeve, and a plurality of second wind plates radially extended from a distal end of said second supporting stem for the fixation of the second flat display monitor.

9. The adjustable dual-screen monitor stand as claimed in claim 8, wherein said first screen holder further comprises a third retaining member mounted in a top side of said first mounting sleeve to prevent falling of said first mounting sleeve out of said first upper swivel arm; said second screen holder further comprises a fourth retaining member mounted in a top side of said second mounting sleeve to prevent falling of said second mounting sleeve out of said second upper swivel arm.

* * * * *